US010116536B2

United States Patent
Palanciuc et al.

(10) Patent No.: US 10,116,536 B2
(45) Date of Patent: Oct. 30, 2018

(54) IDENTIFYING MULTIPLE DEVICES BELONGING TO A SINGLE USER

(71) Applicant: Adobe Systems Incorporated, San Jose, CA (US)

(72) Inventors: Virgil-Artimon Palanciuc, Bucharest (RO); Mihai Daniel Fecioru, Bucharest (RO); Catalin Costache, Bucharest (RO); Charles Menguy, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 435 days.

(21) Appl. No.: 14/944,300

(22) Filed: Nov. 18, 2015

(65) Prior Publication Data

US 2017/0141980 A1 May 18, 2017

(51) Int. Cl.
*G06F 15/173* (2006.01)
*H04L 12/26* (2006.01)

(52) U.S. Cl.
CPC ................... *H04L 43/08* (2013.01)

(58) Field of Classification Search
CPC ............... H04L 43/08; H04L 12/26
USPC ........................................ 709/224
See application file for complete search history.

(56) References Cited

U.S. PATENT DOCUMENTS

| | | | |
|---|---|---|---|
| 8,788,501 B2* | 7/2014 | Li | G06K 9/00973 707/737 |
| 8,849,610 B2* | 9/2014 | Molettiere | A61B 5/1112 702/160 |
| 2004/0103021 A1* | 5/2004 | Scarfe | H04L 12/26 705/13 |
| 2007/0155312 A1* | 7/2007 | Goldberg | G10H 1/0025 455/3.06 |
| 2008/0249905 A1* | 10/2008 | Wong | G06Q 30/02 705/34 |
| 2008/0285464 A1* | 11/2008 | Katzir | H04L 63/1408 370/241 |
| 2010/0146110 A1* | 6/2010 | Christensen | G06F 17/30873 709/224 |
| 2011/0295904 A1* | 12/2011 | Mohan | G06F 17/246 707/802 |
| 2012/0191714 A1* | 7/2012 | Datar | G06F 17/30867 707/737 |
| 2012/0317276 A1* | 12/2012 | Muniraju | H04L 41/14 709/224 |
| 2012/0330959 A1* | 12/2012 | Kretz | G06Q 40/08 707/739 |

(Continued)

OTHER PUBLICATIONS

Hierarchial clustering, https://en.wikipedia.org.wiki/hierarchial_clustering, accessed Nov. 11, 2015, 8 pages.

(Continued)

*Primary Examiner* — Razu A Miah
(74) *Attorney, Agent, or Firm* — Kilpatrick Townsend & Stockton LLP

(57) ABSTRACT

Techniques are disclosed that provide more accurate clustering of devices by forming clusters of devices and merging or changing clusters based on predetermined criteria. The technique starts with a large number of clusters (e.g., one for each account) and refines the clusters, for example, by merging clusters or determining which cluster a given device should be in when the device is associated with multiple clusters. One technique iteratively adjusts clusters of devices by merging clusters determined to be associated with a single user until a cluster contains all of the devices and accounts expected to be associated with a single user.

16 Claims, 8 Drawing Sheets

(56) References Cited

U.S. PATENT DOCUMENTS

| | | | | |
|---|---|---|---|---|
| 2013/0006988 | A1* | 1/2013 | Li | G06K 9/6272 |
| | | | | 707/737 |
| 2013/0204999 | A1* | 8/2013 | Lindberg | H04L 41/142 |
| | | | | 709/223 |
| 2013/0238644 | A1* | 9/2013 | Mohan | G06F 17/246 |
| | | | | 707/756 |
| 2013/0238795 | A1* | 9/2013 | Geffin | G06F 1/206 |
| | | | | 709/224 |
| 2013/0290525 | A1* | 10/2013 | Fedor | H04L 41/147 |
| | | | | 709/224 |
| 2013/0290791 | A1* | 10/2013 | Basile | H04L 43/16 |
| | | | | 714/47.1 |
| 2013/0325861 | A1* | 12/2013 | Jin | G06Q 30/04 |
| | | | | 707/737 |
| 2014/0156833 | A1* | 6/2014 | Robinson | H04L 43/0817 |
| | | | | 709/224 |
| 2015/0156100 | A1* | 6/2015 | Skaaksrud | H04W 76/10 |
| | | | | 709/224 |
| 2015/0326461 | A1* | 11/2015 | Singh | H04L 43/04 |
| | | | | 709/221 |

OTHER PUBLICATIONS

Sun, et al., "Community Evolution Detection in Dynamic Heterogeneous Information Networks," MLG '10, Jul. 24-25, 2010, 10 pages.

Sun, et al. "RankClus: Integrating Clustering with Ranking for Heterogeneous Information Network Analysis," EDBT 2009, Mar. 24-26, 2009, 12 pages.

Xie, et al., "LabelRank: A Stabilized Label Propagation Algorithm for Community Detection in Networks," arXiv:1303.0868v2 [cs.SI], Mar. 13, 2013, 6 pages.

Xie, et al. "SLPA: Uncovering Overlapping Communities in Social Networks via A Speaker-listener Interaction Dynamic Process," http://arxiv.org/abs/1109.5720, accessed Nov. 11, 2015, 3 pages.

GANXiS (aka SLPA), https://sites.google.com/site/communitydetentionslpa/, accessed Nov. 11, 2015, 2 pages.

Hartigan, et al. "Algorithm AS 136: A K-Means Clustering Algorithm," Journal of the Royal Statistical Society, Series C (Applied Statistics), vol. 28, No. 1979, 10 pages.

* cited by examiner

_US 10,116,536 B2_

IDENTIFYING MULTIPLE DEVICES BELONGING TO A SINGLE USER

FIELD OF THE INVENTION

This disclosure relates generally to computer-implemented methods and systems and more particularly relates to improving the efficiency and effectiveness of computing systems used in identifying multiple electronic devices used by a particular individual user.

BACKGROUND OF INVENTION

Individual users commonly have multiple electronic devices. For example, an individual user may have a desktop computer, a laptop, a tablet, a cell phone, and a work computer. It is desirable to determine a set of devices that are associated with a particular user so that, when actions on those devices are tracked, the actions can be associated with a particular user profile and collectively used, for example, to identify and provide targeted marketing and content to the user. However, identifying a set of devices associated with a particular user is often difficult because users commonly have multiple devices, share devices with other users, borrow devices from one another, and use public-access devices. Existing techniques for automatically grouping devices for particular users attempt to make probabilistic determinations based on common IP addresses of devices. A technique that is not dependent on common IP addresses is desirable, because certain countries have privacy regulations barring the use of the full IP address.

Various clustering techniques are useful for grouping various types of data. However, clustering techniques have not been considered viable for grouping devices and users. For example, clustering techniques using certain algorithms such as k-Means algorithms to build computer network clusters require predetermined knowledge such as predetermined knowledge of the number of clusters and thus have been considered ill-suited for use in the context of clustering devices for users since the number of users is large, unknown, and changing over time. In addition, clustering techniques, such as RankClus and EvoNetClus, work with heterogeneous information networks and require the number of clusters to be estimated before running the algorithm. These techniques also assume that there are a very limited number of clusters, and therefore do not scale well in situations where the number of clusters is comparable with the number of nodes in the graph or otherwise involve a very large number of clusters.

SUMMARY

Systems and methods disclosed herein involve grouping devices to facilitate collecting analytics data for particular users from multiple devices. One embodiment involves assessing a plurality of clusters including a first cluster comprising one or more devices and a second cluster comprising one or more devices and identifying that a particular device is in both the first cluster and the second cluster. Based on identifying that the particular device is in both the first cluster and the second cluster, the technique uses predetermined criteria to determine to merge the first cluster and the second cluster to create a single merged cluster or change the first cluster or the second cluster so that the particular device is only in one of the first cluster or the second cluster. Analytics data from devices in the first cluster is associated with a first user and analytics data from devices in the second cluster is associated with a second user.

These illustrative embodiments and features are mentioned not to limit or define the disclosure, but to provide examples to aid understanding thereof. Additional embodiments are discussed in the Detailed Description, and further description is provided there.

DETAILED DESCRIPTION

Figure 1:
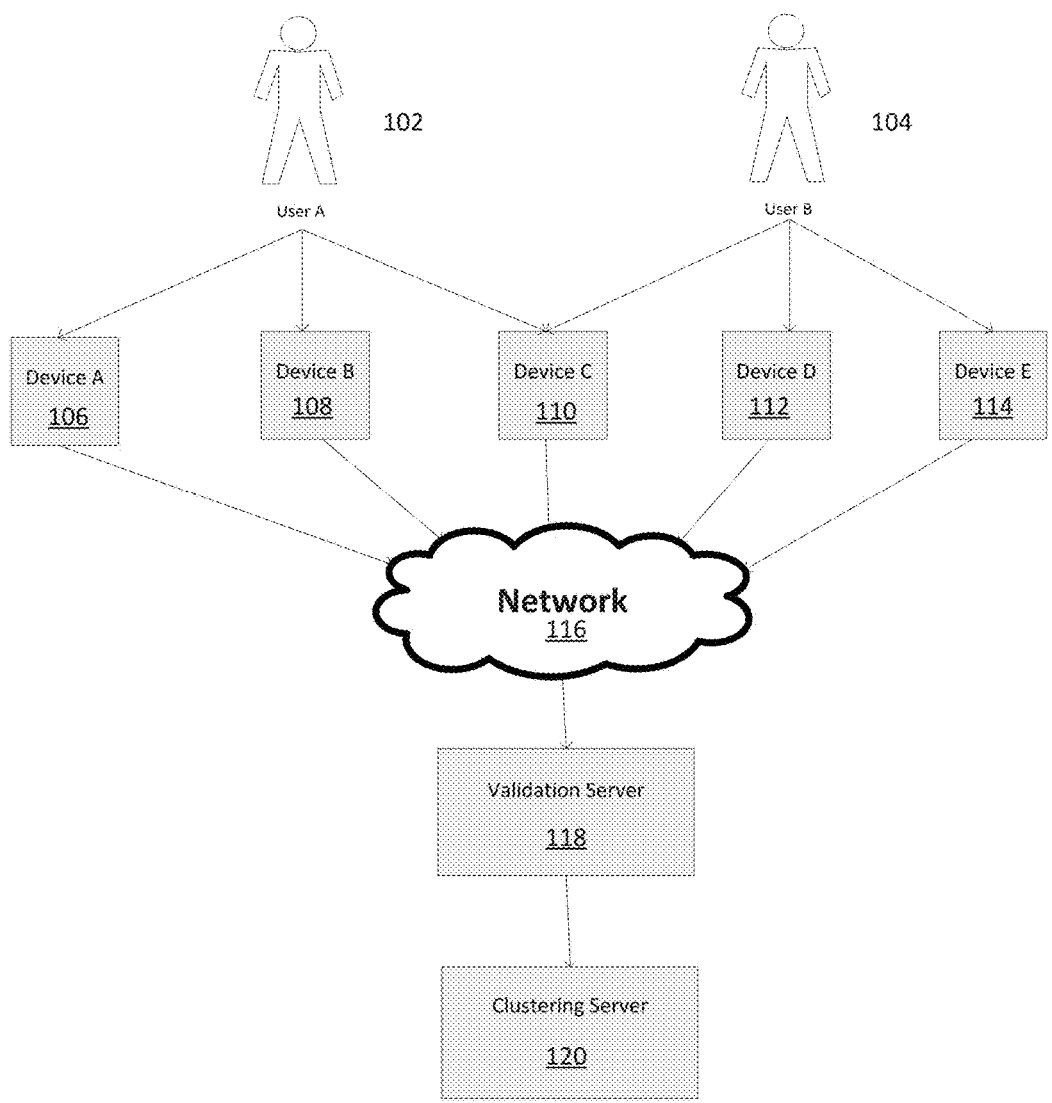
FIG. 1 is a block diagram depicting an example of a system for validating user identifications on various devices and clustering the devices based on the user identifications.

It is desirable to determine a set of devices that are associated with a particular user. Individuals commonly have multiple devices, share devices with other users, borrow devices from one another, and use public-access devices. Unlike prior techniques that associate devices based on common IP address or an explicit distance measure (or an explicit set of distances) between the devices, the techniques disclosed herein provide more accurate clustering of devices using information about which accounts are authenticated on which devices. The technique starts with a large number of clusters (e.g., one for each account) and refines the clusters, for example, by merging clusters or determining which cluster a given device should be in when the device is associated with multiple clusters. One technique iteratively adjusts clusters of devices by merging clusters determined to be associated with a single user until a cluster contains all of the devices and accounts expected to be associated with a single user. For example, two clusters (e.g., a first cluster with a bank account authentication, a cell phone, a home computer, and a tablet; and a second cluster with a retailer account authentication, the cell phone, the home computer, and the tablet) are merged into a single cluster. The two clusters are considered for merger with one another based on the association with common devices (i.e., the cell phone and home computer) and ultimately merged together based on predetermined merger criteria (e.g., enough devices in common, no restrictions in the accounts, etc.). In another example, the clusters are changed to eliminate instances of devices appearing in multiple clusters. For example, two clusters (e.g., one for Joe and one for Joe's wife, Jane) will include a particular device (e.g., Joe's tablet) based on both Joe and Jane using the tablet to authenticate themselves on their respective accounts on the tablet. The technique determines that Joe has authenticated his accounts significantly more times than Jane has authenticated her accounts on the tablet. Based on this, the technique changes Jane's cluster to remove the tablet.

The techniques disclosed herein provide numerous benefits over prior device grouping techniques. The techniques disclosed herein provide accurate, scalable ways to find clusters in heterogeneous information networks. The techniques are implemented without regard to how many clusters are used, are adaptable to more than one clustering strategy, and allow for real-life anomalies that are present in information networks. In addition, starting with a large number of clusters (e.g., one for each account) and refining the clusters allows for efficient processing. The problem of associating devices and accounts with users is unlike many traditional clustering problems because the number of clusters is very large relative to the number of items to be clustered. Unlike traditional clustering techniques which are ill-suited for the scenario of grouping associated devices and accounts, the techniques herein efficiently cluster devices and accounts even when the number of clusters is in the millions or billions. Numerous other benefits are provided as will be evident to those of skill in the art.

In one exemplary embodiment, information for multiple users, using multiple user identifications, on multiple devices is used to cluster devices. An example of a user identification is an account authentication. In this example, account authentications are used as nodes in a clustering algorithm that adjusts nodes based on criteria. The embodiment identifies a large number of clusters by identifying an account authentication and all devices on which the account's authentication was used. Examples of account authentications include any account activity that identifies a unique user including, but not limited to, detection of the establishment of a customer relationship management (CRM) account, verification of a user ID/password combination, detection of the sender of an email, or receiving information from an application running on the user's device.

In this example, noisy nodes are removed from consideration. Exemplary criteria for identifying a node as a noisy node include, but are not limited to criteria identifying situations in which: a user authentication contains errors and is therefore deemed not to be reliable; an apparent user authentication is actually determined to be a bot; or a genuine user is authenticated on a device that is not normally used by that user, which may indicate that the user is borrowing the device. The criteria for identifying noisy nodes may vary according to the implementation.

The exemplary embodiment next involves an iterative process for adjusting the clusters to include devices expected to be associated with particular users. An empty "Do Not Join" set is created the first time through the process. In each iteration, clusters will be evaluated and determined either to be joined with other clusters or modified (due to shared devices). In some situations, it is unclear in which cluster to add a device (or authentication), and the decision can be postponed by adding the device (or authentication) to the Do Not Join set, so that it is no longer used for the purpose of merging clusters throughout the process.

In the first iteration, each authentication represents an initial cluster, with all of the devices the authentication was performed on placed in the cluster. For each initial cluster, a set of pairs is determined. Each pair contains an authentication or a device paired with the cluster designation. For the purposes of illustration, the discussion below assumes a simple network having 3 users and 8 devices. A cluster containing the authentication of Joe logging into his bank account (JB) on a home computer (D1), iPad (D2), cell phone (D3), and a work computer (D4) would contain the following pairs: (C1,JB); (C1,D1); (C1,D2); (C1,D3); and (C1,D4). Another cluster contains Jane logging into her email (JE) on a second home computer (D5), Joe's iPad (D2), a second cell phone (D6) and a second work computer (D7). This cluster would contain the following pairs: (C2, JE); (C2,D5); (C2,D2); (C2,D6); and (C2,D7). The iPad, D2, appears in the first and second clusters because it is used by both Joe and Jane: (C1,D2) and (C2,D2). Another user, Perry may only check his email (PE) on a home computer (D8), so the only pairs generated for Perry's cluster is (C3,PE); (C3,D8).

Next, in the exemplary embodiment, non-repeating authentication or device pairs are removed from consideration. If a device is not used with multiple authentications, it is already in the appropriate cluster because it is already associated with the correct authentication. Therefore, non-repeating authentication or device pairs should not be joined with other clusters. For this reason, (C1,JB); (C1,D1); (C1,D3); (C1,D4); (C2,JE); (C2,D5); (C2,D6); (C2,D7); (C3,PE) and (C3,D8) are removed from consideration. In this example, only the use of D2 is unclear—a determination needs to be performed to determine how to treat D2.

The list of pairs that contains a device from the Do Not Join set is removed from consideration as well. In this simplified example, the Do Not Join set is still empty. If D2 had been added to the Do Not Join set on a previous iteration, for example, if there was not enough information to determine if Joe or Jane was the primary user of the iPad, there would be no clusters that were candidates for merging or adjusting and the process would stop.

At this point, the clusters including the remaining authentications and devices are candidates for merging or adjusting. Various criteria can be used to evaluate whether or not to merge or adjust the clusters, based on the implementation. Clusters that are likely to represent the same user are merged. For example, a user might have two email accounts or an email account and a bank account. It is to be expected that the user would use the same set of devices to access the multiple accounts, or a set of devices that was very similar. Such a cluster would be merged. In the present example, two users use one device: Joe and Jane both use the iPad to access Joe's bank account and Jane's email. If an analysis indicated that Jane did not use the iPad for any other purpose, the iPad can be assumed to be Joe's iPad. and would remain in his cluster, C1, and be removed from Jane's cluster, C2, thereby adjusting the clusters.

In this case, the first cluster, C1, contains (C1,JB); (C1, D1); (C1,D2); (C1,D3); and (C1,D4). The second cluster, C2, contains (C2,JE); (C2,D5); (C2,D6); and (C2,D7). The third cluster, C3, contains (C3,PE) and (C3,D8).

If, however, Jane used the iPad to access other accounts, in this example, the appropriate cluster for the iPad is less obvious. The system does not allow the device to remain in both clusters. The system will eventually choose a cluster that is most likely to be the appropriate cluster for the device.

Various criteria can be considered to determine whether or not to merge or otherwise adjust the clusters, and the criteria used can have various thresholds. If it is determined that the use of D2 cannot be associated with one cluster, the device D2 is added to the Do Not Join set and will not be reconsidered as a reason for merging/modifying clusters, in subsequent iterations.

If clusters are changed, creating 'new' clusters, the new clusters are compared with other clusters to see if they should be further merged or adjusted. The process starts over with generating the list of pairs for each cluster.

After the clusters have all been evaluated and it has been determined that they should not be merged with any other clusters, the noisy nodes are added back. Any devices or authentications that still appear in more than one cluster are evaluated, and the most appropriate cluster is selected so each device or authentication will only appear in one cluster. At this point, the complete set can be used for the purpose of analyzing the behavior of the user and/or targeting advertisements or other content to the user across the user's various devices.

In another example, the user is unknown. Email (E) is accessed on devices D1, D2, D3, and D4; and a bank account (B) is accessed on devices D1, D2, D3, D4, and D5. The first cluster, C1, would contain the following pairs: (C1,E); (C1,D1); (C1,D2); (C1,D3); and (C1,D4). The second cluster, C2, would contain the following pairs: (C2,B); (C2,D1); (C2,D2); (C2,D3) (C2,D4) and (C2,D5). Devices D1, D2, D3, and D4 appear in both C1 and C2. If it is determined that these devices are properly associated with the user checking email, the clusters are merged.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the term "cluster" refers to a group of one or more devices associated with one or more accounts. Various methods are used to determine that the devices belong to a cluster. A cluster may be composed of devices that are expected to be associated with a particular user, devices that are not expected to be associated with a particular user, or a combination of devices that are and are not expected to be associated with a particular user. A cluster may be composed of devices that are actually physically clustered, such as devices on a particular wired network. A cluster may also be composed of devices that are not actually physically clustered, either because the devices are connected wirelessly or because they are on multiple wired or wireless networks. When the devices are not actually physically clustered, they may be treated as though they are physically clustered. A cluster of devices that are not physically clustered can be thought of as a virtual cluster. In one example, a cluster includes a user bank account and three devices associated with the bank account. In another example, a cluster includes a bank account, an e-mail account, and an online merchant account and five associated devices.

As used herein, the term "user" refers to a person accessing an account or electronic content using one or more devices. A user may have one or more accounts. A user may be a known person or anonymous.

As used herein, the term "device" refers to an electronic apparatus used to access an account or electronic content. Examples of devices include, but are not limited to, a desktop computer, a laptop, a tablet, a cell phone, a wearable electronic device such as a watch, and other smart objects with network connectivity according to the Internet of Things, such as appliances, including ovens, refrigerators, televisions, air conditioners, thermostats, after-market products to make appliances smart, etc. A particular user may own or use one device or many devices. Each device may be used to perform particular functions, or the devices may have overlapping functions. Devices can be connected via the internet or a private network, on a wired or wireless connection.

As used herein, the term "noisy device" refers to a device which is considered to be used by too many users or on too many IP addresses to reliably be classified as belonging to a particular user. For example, a device used by many users may be considered a noisy device based on it being likely to be a publicly accessible device, an otherwise heavily borrowed device, or a bot.

As used herein, the term "user identification" refers to information sent from a device that provides information about a person who is performing the action. The user identification may explicitly indicate the person's identity. If the user identification does not explicitly indicate the person's identity, e.g., the person is anonymous, the user identification provides information sufficient to identify when the same user is using different devices. A user identification may be an activity that requires interaction from the user or may be an activity that does not require interaction from the user. Examples of user identifications include the creation of a CRM profile, the authentication of a log-in and password provided to access software, the authentication of a log-in and password provided to access an account, the authentication of a log-in and password to access a file, the authentication of a log-in and password to access a website, the sending of an email, or the obtaining of an IP address.

As used herein, the term "account authentication" refers to information used to access an electronic account. One example of account authentication is a user creating a log-in and password. Another example is a user providing a log-in and password to access an account. Another example is an electronic device automatically logging a user into an account by providing account credentials.

As used herein, the term "analytics data" refers to information gathered to identify information about a user. The information may be demographic, may indicate trends in the user's habits, or may be another type of data. The information may be gathered for various purposes, including for the purpose of marketing. The analytics data may be analyzed in real time or it may be saved to be analyzed at a later time.

Referring now to the drawings, FIG. 1 is a block diagram depicting an example of a system for validating user identifications on various devices and clustering the devices based on the user identifications. User A 102, and User B 104, represent users associated with certain behavior that is tracked.

Device A 106, Device B 108, Device C 110, Device D 112, and Device E 114, represent devices that are used by User A 102 and User B 104 to access the Network 116, such as the internet. The devices may be identified by various attributes, such as MAC address, location of device, information contained in a cookie, or by an assigned device name.

In this example, User A 102 accesses the Network 116 with Device A 106, Device B 108, and Device C 110; and User B 104 accesses the Network 116 with Device C 110, Device D 112, and Device E 114. Both User A 102 and User B 104 access the Network 116 with Device C 110. It is possible for users to use any number of devices and for each device to be shared by any number of users.

Validation Server 118 identifies the users, in this case User A 102 and User B 104, accessing the Network 116. Validation Server 118 identifies users based on various types of activities performed on a device, including but not limited to, the obtaining of an IP address, the creation of a CRM profile, the authentication of a log-in and password, the sending of an email, etc. Identified users may be anonymous.

Clustering Server 120 builds clusters of accounts and devices likely to be associated with particular users. An appropriate clustering algorithm is used to generate clusters of devices that are likely to be used by each user. In this example, Device A 106, Device B 108, and Device C 110 may be associated with User A 102; and Device C 110, Device D 112, and Device E 114 may be associated with User B 104. Depending on the clustering algorithm used and the weights given to various attributes, Device C 110 may be placed in the cluster for User A 102 or User B 104.

Figure 2:
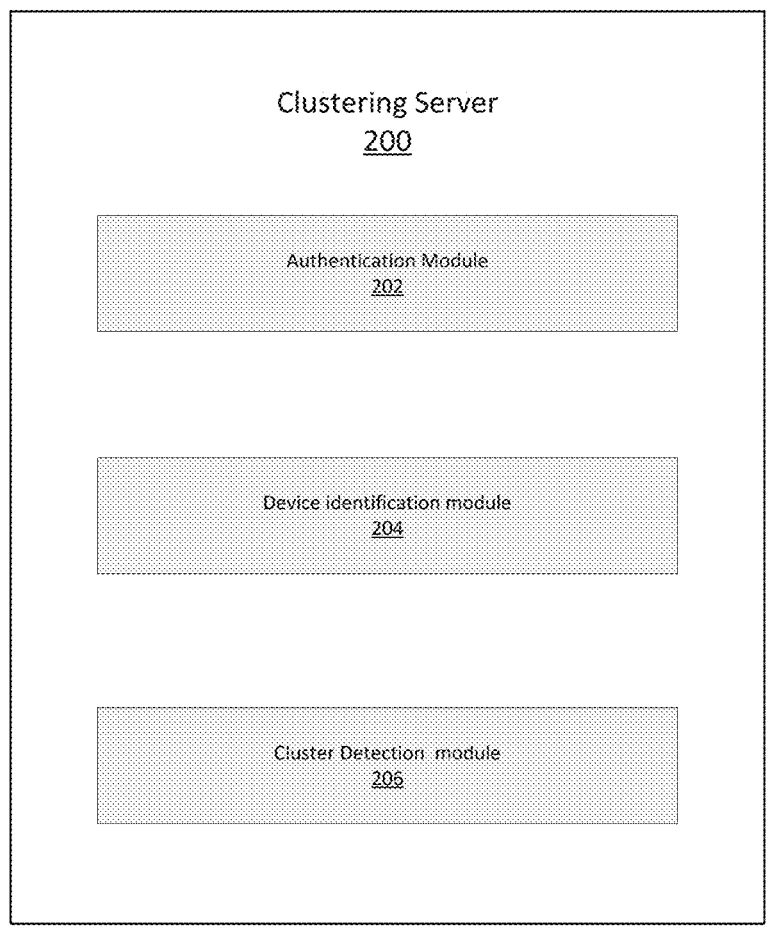
FIG. 2 is a block diagram illustrating exemplary modules for implementing functions in the clustering server of FIG. 1.

FIG. 2 is a block diagram illustrating exemplary modules for implementing functions in Clustering Server 120 of FIG. 1. The Clustering Server 120 includes modules 202, 204, and 206, which each are implemented by a processor executing stored computer instructions. Authentication Module 202 provides one or more methods to identify users accessing the network using information known about or supplied by each user. Authentication Module 202 may also collect metadata for each authentication, such as the date a CRM profile was created or the time of the authentication.

Device Identification Module 204 analyzes information known about each device to identify distinct devices. The Device Identification Module 204 also seeks to identify information about the device in each user/device pairing, such as the IP address of the device, the location of the device, hardware characteristics of the device, etc., when such information is available.

Cluster Detection Module 206 analyzes the information gathered regarding each authentication and each device associated with each authentication to determine clusters of devices and how such clusters should be merged or changed. Such processing may involve comparing the authentication and device criteria to metadata stored for clusters previously known to exist.

Figure 3:
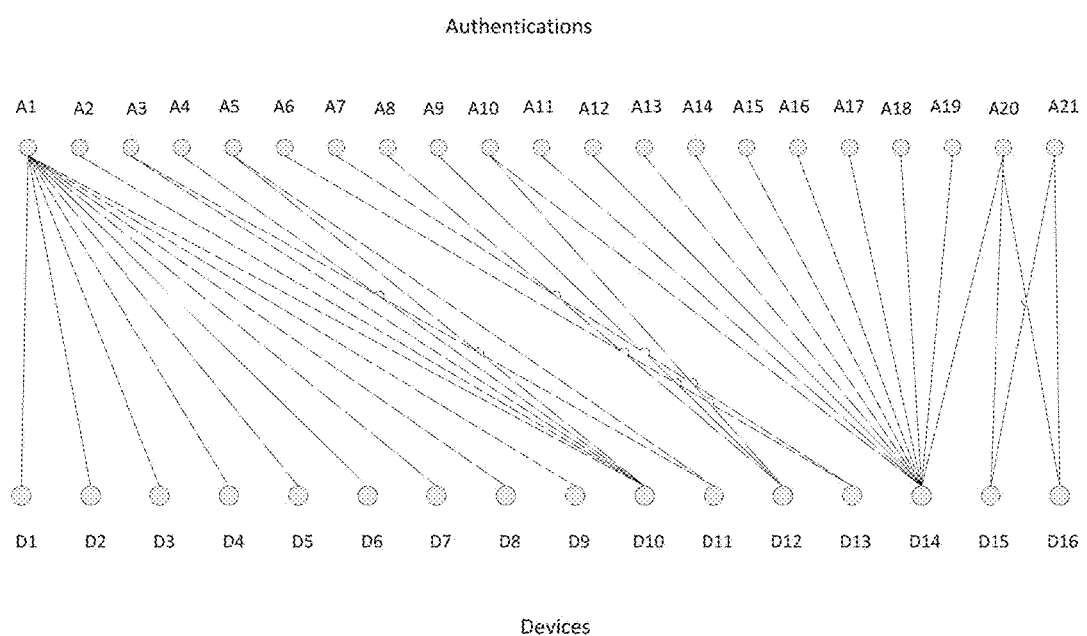
FIG. 3 shows a bipartite graph with two types of nodes.

FIG. 3 shows a bipartite graph with two types of nodes—a set of devices, a set of authentications, and the connections between each device and each authentication. In FIG. 1, the nodes labeled with a designation starting with 'A' represent authentications, and nodes labeled with a designation starting with 'D' represent devices. In this example, some authentications are performed on a few devices, such as one or two, and other authentications are performed on many devices, such as ten. Likewise, some devices have only one authentication performed on them, and other devices have many authentications performed on them, such as ten.

Figure 4:
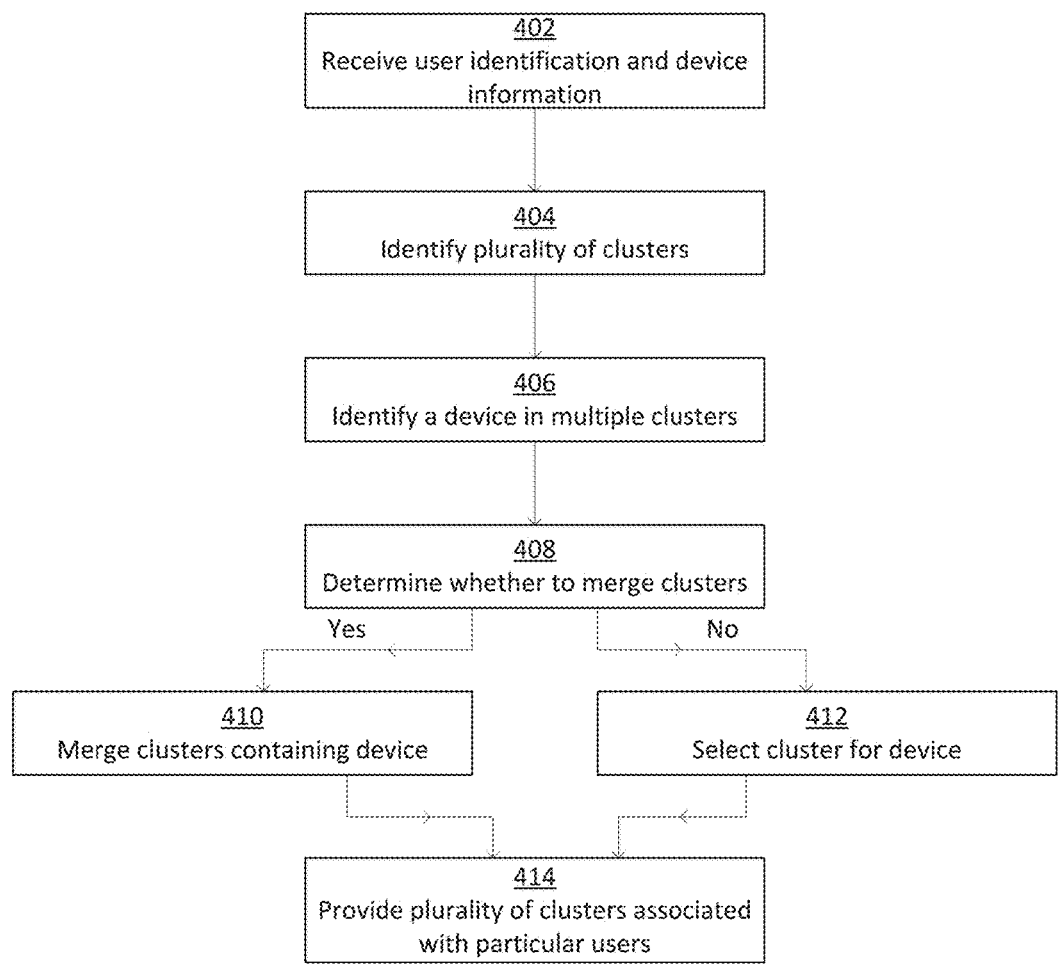
FIG. 4 is a flowchart illustrating clustering of authentications and devices.

FIG. 4 is a flowchart illustrating the clustering of authentications and devices. At 402, user identification and device information is received. A user may be identified based on authentication provided by a user to create or access an online account, authentication provided by a user to access a piece of software, authentication provided by a user to access a file, or authentication provided by a user to access the computer. Other types of user identification include, but are not limited to, the sender of an email or cached information that is acknowledged to access a website Device information that may be received includes an IP address for the device, a device identifier such as a MAC address or device name, the location of the device, information contained in a cookie on the device, or the type of device. Other types of device information can be envisioned.

At 404, a plurality of clusters is identified based on the information relating the user identifications and devices on which the user identifications were received. Various algorithms may be used to identify the clusters. Clusters may be arranged by user identification, such that a first cluster is comprised of a first group of devices on which a first user identification was received and a second cluster is comprised of a second group of devices on which a second user identification was received. Clusters may also be arranged by IP address.

At 406, devices which appear in multiple clusters are identified. A device would appear in multiple clusters if more than one user has been identified as having used that device to provide a user identification. For example, a notebook device might be used by both a husband and a wife to access their email accounts. As another example, a shared office computer might be accessed by multiple users to access a piece of software.

At 408, a determination is made on whether the multiple clusters associated with the device in 406 should be merged. Any algorithm or set of priorities may be used to make the determination. Criteria used to establish the priorities include first device used, last device used, most frequent device used, common characteristic of devices used, such as IP address or location of device, or information indicating that the users in the two clusters are actually the same person. Algorithms may weight various criteria.

If it is determined that the clusters should be merged, at 410, the clusters are merged. The clusters are merged by combining the authentications and devices appearing in the clusters in question. A new cluster identifier is assigned to the combined cluster of authentications and devices in this embodiment. Alternatively, one or both clusters in question will be changed to include the authentications and devices from the other cluster and a new cluster identifier is assigned to the changed cluster.

If it is determined that the clusters should not be merged, at 412, one of the multiple clusters is selected for the device that appears in multiple clusters. The selection of the cluster may be based on which device was used first, which device was used last, the frequency of use of the device by the two users, a lack of common characteristics of the devices in the two clusters, such as IP address or location of device, or information indicating that the users in the two clusters are not the same person.

When the evaluation of whether or not to merge the clusters and the possible merging of the clusters is complete, at 414, the plurality of clusters associated with the particular users is stored or otherwise provided for use, for example, in providing targeting advertising.

Figure 5:
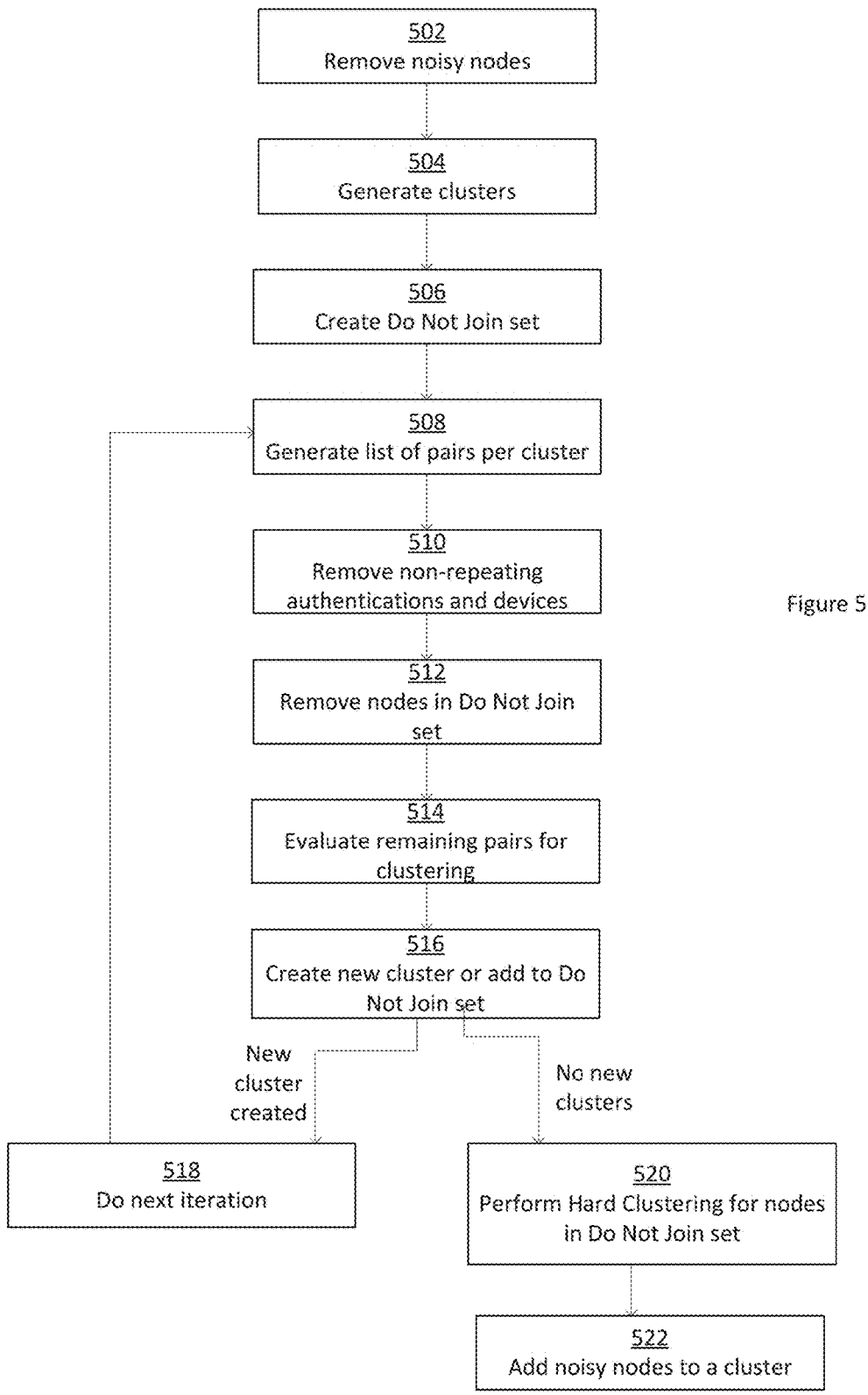
FIG. 5 is a flowchart illustrating an example of an algorithm to determine clusters of devices associated with a user.

FIG. 5 is a flowchart illustrating an example of an algorithm to determine clusters of devices associated with a user.

Data collected about connections between devices and authentications may be noisy, i.e. the user authentications may contain errors; apparent user authentications occurring on multiple devices may actually be a bot; or a genuine user may be authenticated on a device that is not normally used by that user, such as when the user is borrowing a device. In step 502, these noisy nodes are removed.

In step 504, the devices are grouped by authentication to generate the initial set of clusters. In one embodiment, for the initial generation of the clusters, each authentication is used to create a cluster. Therefore, each cluster is composed of an authentication and the devices on which it was detected. Detection of the authentications on each device may be accomplished using any appropriate authentication detection technique.

In step 506, devices and authentications that should not be used as signals for joining clusters in future iterations are stored as a Do Not Join set. The first time through the process, the set is empty, but in later iterations, devices and/or authentications are added to the set when they are not to be considered as signals for cluster merging.

In step 508, a list of pairs for each cluster is generated. The pairs contain the cluster identifier value and a single authentication identifier or device identifier. For example, referring to FIG. 3, if a cluster C1 contains authentication A1 and devices D1 to D10, the resulting pairs would be (C1, A1), (C1, D1), (C1, D2) . . . (C1, D10) and if a cluster C2 contains authentication A2 and device D10, the resulting pairs would be (C2,A2), (C2, D10). The pairs are generated for all clusters. The designation for the user or device in each pair is considered the key. The pairs are grouped according to the key. For the key A1, the group would contain C1 and any other cluster A1 appears in; for the key D10, the group would contain C1, C2, and any other cluster D10 appears in. In this way, the remaining pairs are grouped according to the key.

In step 510, authentications and devices paired with only one cluster, i.e. the groups containing only one value, are filtered out. In the example above, the group for A1 only contains one value, C1 and the group for A2 only contains C2. These groups are filtered out. They do not need to be merged or otherwise altered, because they indicate that a single device is used for each authentication, meaning that the device is associated with a particular user. The groups remaining after the filtering identifies a list of authentications or devices that appear in multiple clusters. For these groups, the system generates all distinct pairs for the groups having more than one value. In the example above, for key D10, the distinct pairs is (C1, C2). A group containing three values, such as C1, C2, and C3, would have the following distinct pairs emitted: (C1, C2); (C1, C3); and (C2, C3).

In step 512, pairs that are keyed off a device or authentication from the "Do Not Join" set are removed from consideration. The benefit of building and using a Do Not Join set is to save processor resources and complete the merging process more quickly than if every pair were evaluated in every iteration, while at the same time postponing the decision on the final cluster for all devices and authentications that do not have a clear cluster affinity, i.e. that may seem to belong to more than one cluster.

In step 514, the pairs of clusters remaining after 512 are evaluated for clustering. The set of authentications and devices that appear in multiple clusters is evaluated to determine if the clusters should be merged.

In step 516, if it is determined that the clusters should be merged, those clusters are merged and a new cluster identifier is created, such as Cn. Cn contains the merged set of authentications and devices. If, however, it is determined that the clusters should not be joined, the devices and authentications that they have in common are added to the Do Not Join set.

In step 518, if new clusters were created, the process returns to 508 and continues for another iteration. Newly created clusters must be evaluated for joining with another cluster. A device or authentication may still be in multiple clusters because it appears in the Do Not Join set.

At the end of the process, each authentication and device will only appear in one cluster. In step 520, for the authentication IDs or device IDs in the Do Not Join set, the best cluster is selected for that authentication or device to perform the Hard Clustering. In step 522, noisy nodes that were removed in 502 are each put into a cluster that is most appropriate for that node.

Figure 6:
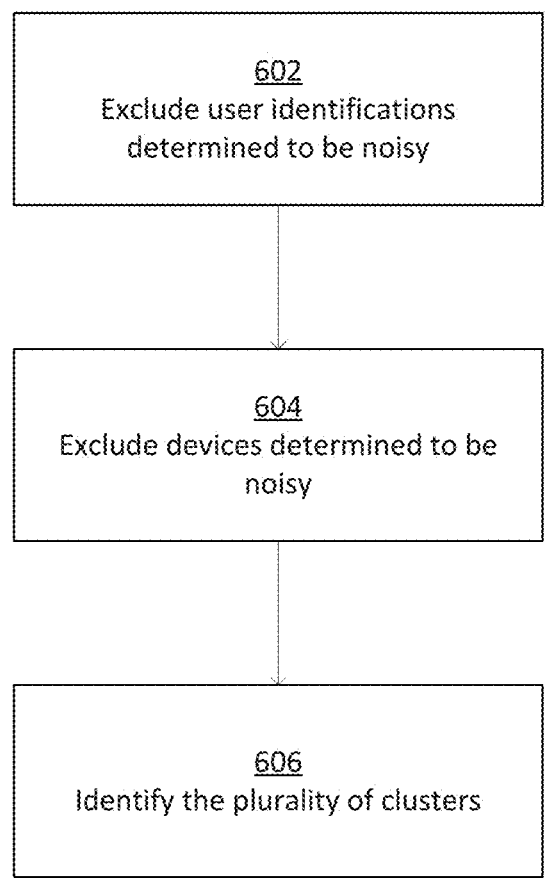
FIG. 6 is a flowchart illustrating the removal of noisy nodes.

FIG. 6 is a flowchart further illustrating the removal of noisy nodes. At 602, user identifications that are determined to be noisy are removed. Each implementation may use various priorities and algorithms to establish that a user identification is noisy. For example, a user identification may be determined to be noisy if it was performed outside of a specified time period or if it is used on a number of devices that exceeds a threshold, which indicates that the device is actually a bot as opposed to a genuine user. At 604, devices that are determined to be noisy are removed. Each implementation may use various priorities and algorithms to establish that a device is noisy. For example, a device may be noisy if greater than a threshold number of user identifications are performed on the device or if fewer than a threshold number of user identifications are performed on the device, indicating that the device is borrowed. At 606, clusters are identified for the remaining nodes.

Figure 7:
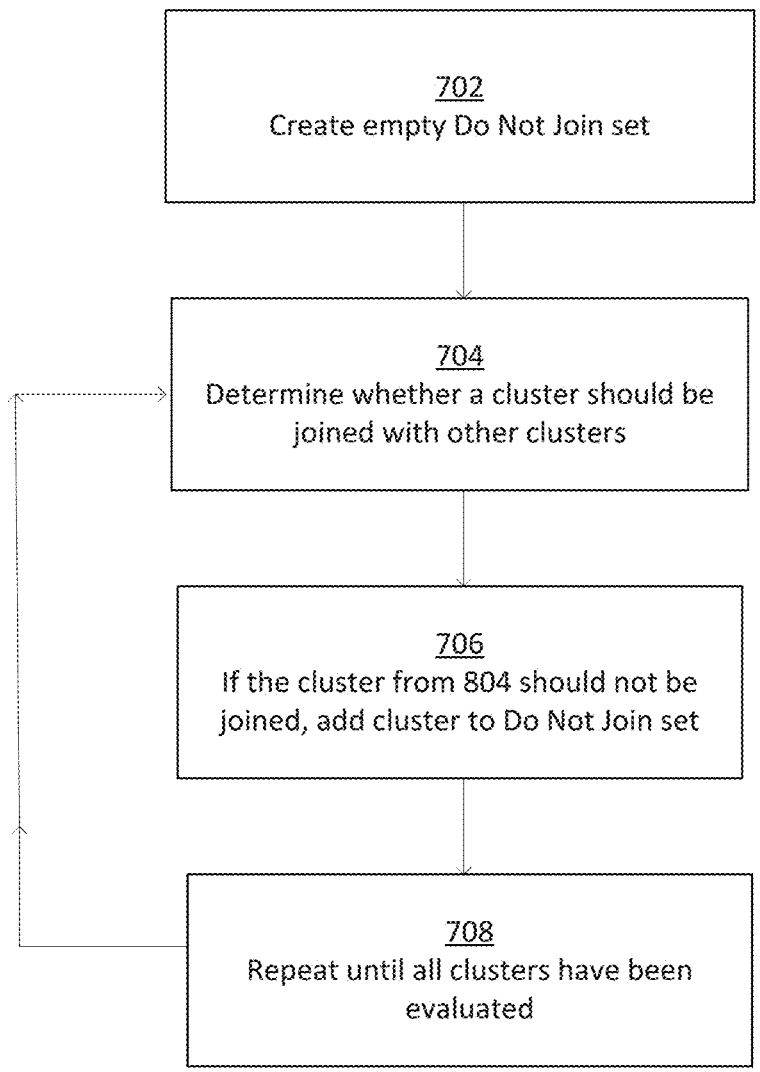
FIG. 7 is a flowchart illustrating adding devices or authentications to a do not join set.

FIG. 7 is a flowchart further illustrating adding devices and/or user identifications to the Do Not Join set. At 702, an empty Do Not Join set is created. At 704, each cluster is evaluated as to whether it should be joined with other clusters, for example, if the presence of devices and/or user identifications in multiple clusters is not interpreted as a signal to join the clusters. At 706, clusters determined not to be joined in 704 will have all their common devices and/or user identifications added to the Do Not Join set. If any clusters will be joined to another cluster, nothing is added to the Do Not Join set. In 708, the process checks to see if all clusters have been evaluated. If they have not, the process returns to 704 for the clusters that are yet to be evaluated.

Figure 8:
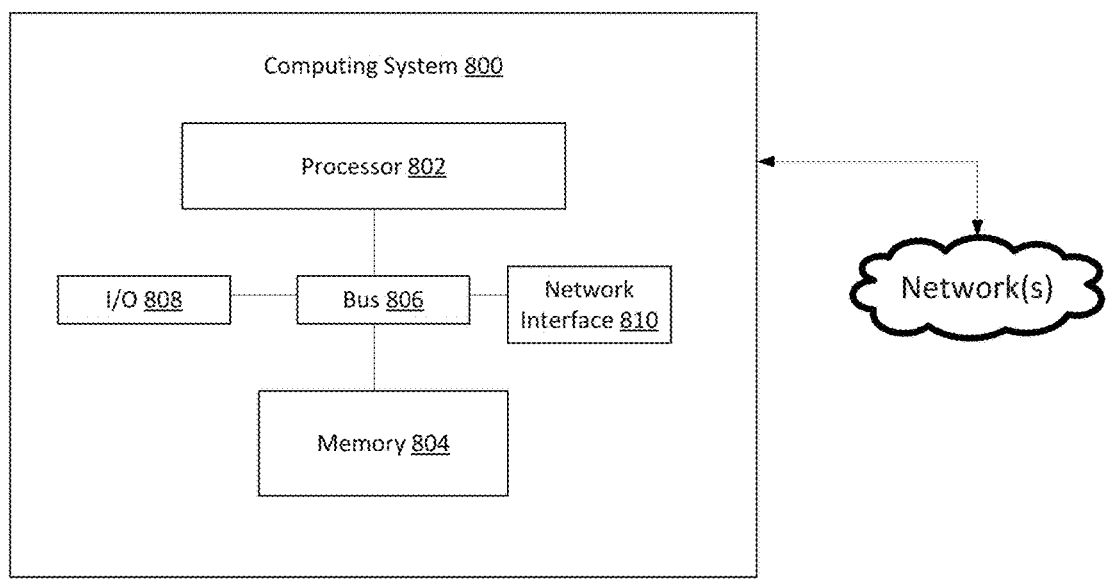
FIG. 8 is a block diagram depicting an example of a computing system used to execute certain embodiments.

Any suitable device or set of computing devices can be used to execute the techniques described herein. For example, FIG. 8 is a block diagram depicting an example of a computing system 800. Although this figure depicts a single computing system for illustrative purposes, any number of servers or other computing devices can be included in a computing system. For example, a computing system may include multiple computing devices configured in a grid, cloud, or other distributed computing system that executes the credit path application.

The computing system 800 can include a processor 802 that is communicatively coupled to a memory 804 and that executes computer-executable program instructions and/or accesses information stored in the memory 804. The processor 802 can include one or more microprocessors, one or more application-specific integrated circuits, or one or more other suitable processing devices. The processor 802 can include any of a number of processing devices, including one processor. The processor 802 can include or may be in communication with a memory 804 that stores program code. When executed by the processor 802, the program code causes the processor to perform the operations described herein.

The memory 804 can include any suitable computer-readable medium. The computer-readable medium can include any electronic, optical, magnetic, or other storage device capable of providing a processor with computer-readable program code. Non-limiting examples of a computer-readable medium include a CD-ROM, DVD, magnetic disk, memory chip, ROM, RAM, an ASIC, a configured processor, optical storage, magnetic tape or other magnetic storage, or any other medium from which a computer processor can read instructions. The program code may include processor-specific instructions generated by a compiler and/or an interpreter from code written in any suitable computer-programming language, including, for example, C, C++, C#, Visual Basic, Java, Python, Perl, JavaScript, and ActionScript.

The computing system 800 may also include, or be communicatively coupled with a number of external or internal devices, such as input or output devices. For example, the computing system 800 is shown with an input/output ("I/O") interface 808 that can receive input from input devices or provide output to output devices. A bus 806 can also be included in the computing system 800. The bus 806 can communicatively couple one or more components of the computing system 800.

The computing system 800 can execute program code. The program code may be resident in any suitable computer-readable medium and may be executed on any suitable processing device. The program code can reside in the memory 804 at the computing system 800. The program code stored in the memory 804 can configure the processor 802 to perform the operations described herein.

The computing system 800 can also include at least one network interface 810. The network interface 810 can include any device or group of devices suitable for establishing a wired or wireless data connection to one or more data networks. Non-limiting examples of the network interface 810 include an Ethernet network adapter, a modem and/or the like.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The analytical system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the operations presented in the examples above can be varied—for example, operations can be re-ordered, combined, and/or broken into sub-blocks. Certain operations or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Each of the disclosed aspects, examples, or features may be combined with one or more of the other aspects, examples, or features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In an environment in which analytics data is compiled from users using devices connected to a computer network, a method for grouping devices to facilitate collecting analytics data for particular users from multiple devices, the method comprising:

excluding, from information relating to user identifications and devices on which the user identifications were received, one or more of:
   (i) a particular user identification based on determining that data regarding the particular user identification is noisy, wherein determining that the particular user identification is noisy comprises determining that the particular user identification was received by more than a threshold number of devices, and
   (ii) a particular device based on determining that data regarding the particular device is noisy, wherein determining that the particular device is noisy comprises determining that the particular device received more than a threshold number of different user identifications;

identifying, based on the information excluding the one or more of the particular user identification and the particular device, a plurality of clusters including a first cluster comprising one or more devices and a second cluster comprising one or more devices, wherein the first cluster is initially identified by identifying devices on which a first user account authentication was received and the second cluster is initially identified by identifying devices on which a second user account authentication was received;

identifying that a particular device is in both the first cluster and the second cluster; and based on identifying that the particular device is in both the first cluster and the second cluster, determining, based on a predetermined criteria, to:
   merge the first cluster and the second cluster to create a single merged cluster; or
   change the first cluster or the second cluster so that the particular device is only in one of the first cluster or the second cluster, wherein analytics data from devices in the first cluster is associated with a first user and analytics data from devices in the second cluster is associated with a second user.

2. The method of claim 1, wherein the first cluster comprises devices for an unknown user.

3. The method of claim 1, wherein the first cluster is initially identified by identifying devices on which a first user identification was received and the second cluster is initially identified by identifying devices on which a second user identification was received.

4. The method of claim 1, further comprising iteratively identifying clusters having common devices and determining whether to merge the identified clusters based on the predetermined criteria, wherein clusters considered for merger and not merged in one iteration are not considered for possible merger in later iterations.

5. The method of claim 1 further comprising determining, based on the predetermined criteria, to merge the first cluster and the second cluster to create the single merged cluster, wherein the predetermined criteria use information about a user identification associated with the first cluster or the second cluster to determine whether to merge.

6. The method of claim 1 further comprising determining, based on the predetermined criteria, to merge the first cluster and the second cluster to create the single merged cluster, wherein the predetermined criteria use a minimum number of common devices in both the first cluster and the second cluster to determine whether to merge.

7. A computing system comprising:
a non-transitory computer-readable medium; and
a processor communicatively coupled to the non-transitory computer-readable medium, wherein the processor is configured for executing instructions stored in the non-transitory computer-readable medium on one or more devices, wherein, when executed by the processor, the instructions perform operations comprising:
excluding, from information relating to user identifications and devices on which the user identifications were received, one or more of:
(i) a particular user identification based on determining that data regarding the particular user identification is noisy, wherein determining that the particular user identification is noisy comprises determining that the particular user identification was received by more than a threshold number of devices, and
(ii) a particular device based on determining that data regarding the particular device is noisy, wherein determining that the particular device is noisy comprises determining that the particular device received more than a threshold number of different user identifications;
identifying, based on the information excluding the one or more of the particular user identification and the particular device, a plurality of clusters including a first cluster comprising one or more devices and a second cluster comprising one or more devices, wherein the first cluster is initially identified by identifying devices on which a first user account authentication was received and the second cluster is initially identified by identifying devices on which a second user account authentication was received;
identifying that a particular device is in both the first cluster and the second cluster; and
based on identifying that the particular device in both the first cluster and the second cluster, determining, based on predetermined criteria, to:
merge the first cluster and the second cluster to create a single merged cluster; or
change the first cluster or the second cluster so that the particular device is only in one of the first cluster or the second cluster,
wherein analytics data from devices in the first cluster is associated with a first user and analytics data from devices in the second cluster is associated with a second user.

8. The system of claim 7, wherein the plurality of clusters represent groupings of devices and accounts expected to be associated with particular users.

9. The system of claim 7, wherein the first cluster comprises devices for an unknown user.

10. The system of claim 7, wherein the operations further comprise iteratively identifying clusters having common devices and determining whether to merge the identified clusters based on the predetermined criteria, wherein clusters considered for merger and not merged in one iteration are not considered for possible merger in later iterations.

11. The system of claim 7, wherein the operations further comprise determining, based on the predetermined criteria, to merge the first cluster and the second cluster to create the single merged cluster, wherein the predetermined criteria use information about a user account associated with the first cluster or the second cluster to determine whether to merge.

12. A non-transitory computer-readable medium embodying program code executable by a computer system, the non-transitory computer-readable medium comprising:
program code for excluding, from information relating to user identifications and devices on which the user identifications were received, one or more of:
(i) a particular user identification based on determining that data regarding the particular user identification is noisy, wherein determining that the particular user identification is noisy comprises determining that the particular user identification was received by more than a threshold number of devices, and
(ii) a particular device based on determining that data regarding the particular device is noisy, wherein determining that the particular device is noisy comprises determining that the particular device received more than a threshold number of different user identifications;
program code for identifying, based on the information excluding the one or more of the particular user identification and the particular device, a plurality of clusters including a first cluster comprising one or more devices and a second cluster comprising one or more devices, wherein the first cluster is initially identified by identifying devices on which a first user account authentication was received and the second cluster is initially identified by identifying devices on which a second user account authentication was received;
program code for identifying that a particular device is in both the first cluster and the second cluster;
program code for based on identifying that the particular device is in both the first cluster and the second cluster, determining, based on predetermined criteria, to:
merge the first cluster and the second cluster to create a single merged cluster; or
change the first cluster or the second cluster so that the particular device is only in one of the first cluster or the second cluster,
wherein analytics data from devices in the first cluster is associated with a first user and analytics data from devices in the second cluster is associated with a second user.

13. The non-transitory computer-readable medium of claim 12, wherein the plurality of clusters represent groupings of devices and accounts expected to be associated with particular users.

14. The non-transitory computer-readable medium of claim 12, the first cluster comprises devices for an unknown user.

15. The non-transitory computer-readable medium of claim 12, further comprising program code for iteratively identifying clusters having common devices and determining whether to merge the identified clusters based on the predetermined criteria, wherein clusters considered for merger and not merged in one iteration are not considered for possible merger in later iterations.

16. The non-transitory computer-readable medium of claim 12 further comprising program code for determining, based on the predetermined criteria, to merge the first cluster and the second cluster to create the single merged cluster, wherein the predetermined criteria use information about a user account associated with the first cluster or the second cluster to determine whether to merge.

* * * * *